(12) United States Patent
Tiemann et al.

(10) Patent No.: US 10,216,010 B2
(45) Date of Patent: Feb. 26, 2019

(54) DETERMINING USER DATA BASED ON IMAGE DATA OF A SELECTED EYEGLASS FRAME

(71) Applicant: Rodenstock GmbH, Munich (DE)

(72) Inventors: Markus Tiemann, Munich (DE); Peter Seitz, Munich (DE); Leo Schmid, Diessen Am Ammersee (DE); Adam Muschielok, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 15/504,238

(22) PCT Filed: Aug. 17, 2015

(86) PCT No.: PCT/EP2015/001691
§ 371 (c)(1),
(2) Date: Feb. 15, 2017

(87) PCT Pub. No.: WO2016/026570
PCT Pub. Date: Feb. 25, 2016

(65) Prior Publication Data
US 2017/0269384 A1    Sep. 21, 2017

(30) Foreign Application Priority Data
Aug. 21, 2014    (DE) .................. 10 2014 012 452

(51) Int. Cl.
*G02C 13/00*    (2006.01)
(52) U.S. Cl.
CPC .................. *G02C 13/005* (2013.01)
(58) Field of Classification Search
CPC ........... A61B 3/14; A61B 3/0025; A61B 3/12; A61B 3/102; A61B 3/0058; A61B 3/111; G02C 13/005; G02C 13/003; G02C 7/027
(Continued)

(56) References Cited

U.S. PATENT DOCUMENTS 6,227,667 B1 *   5/2001   Halldorsson ......... G02B 27/017
                                            351/206
2003/0123026 A1 *  7/2003   Abitbol ................ G02C 13/003
                                            351/204
(Continued)

FOREIGN PATENT DOCUMENTS

DE   102009004383 A1   7/2009
DE   102011115239 A1   3/2013
(Continued)

OTHER PUBLICATIONS

S. Russel, et al., "Artificial Intelligence: A Modern Approach", 946 pgs., Prentice Hall, 3rd Edition, 2009.
(Continued)

*Primary Examiner* — Mohammed Hasan
(74) *Attorney, Agent, or Firm* — Schiff Hardin LLP

(57) ABSTRACT

A method of determining of user data for the production of an eyeglass lens for a selected eyeglass frame for a user. The method includes providing an eyeglass frame image data set of the selected eyeglass frame; gathering user image data at least of one portion of the user's head, together with at least one part of the selected eyeglass frame worn by the user; finding the pupils of the user in the user image data, and determining a pupil data set, said pupil data set comprising the size and/or the shape and/or the relative distance between the pupils of the user; and determining contour points of the rim of the eyeglass lens to be produced in the user image data, based on the eyeglass frame image data set and the pupil data set.

18 Claims, 7 Drawing Sheets

Figure 1:
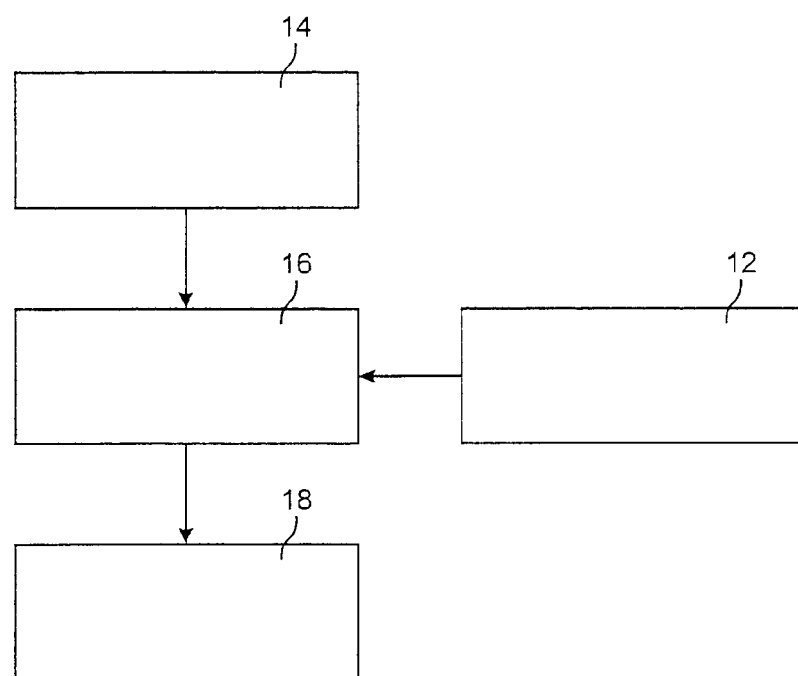

(58) Field of Classification Search
USPC .................................................. 351/200–246
See application file for complete search history.

(56) References Cited

U.S. PATENT DOCUMENTS

2011/0299033 A1* 12/2011 Wada ...................... G02C 7/027
351/204
2012/0182521 A1* 7/2012 Kubitza ................. G02C 7/025
351/204

FOREIGN PATENT DOCUMENTS

| FR | 1450201 A | 5/1966 |
| FR | 2772936 A1 | 6/1999 |
| JP | 2006-155638 A | 6/2006 |
| JP | 2008-536149 A | 9/2008 |
| JP | 2010-266892 A | 11/2010 |
| JP | 2011-253042 A | 12/2011 |
| JP | 2012-239566 A | 12/2012 |

OTHER PUBLICATIONS

C. Steger, et al., "Machine Vision Algorithms and Applications", 4 pgs., Wiley-VCH, 2008.
German Patent Office, International Search Report, for PCT/EP2015/001691, dated Nov. 11, 2015.
Office Action dated Dec. 7, 2018 for Japanese Patent Application No. 2017-510399 (with English translation).

* cited by examiner

DETERMINING USER DATA BASED ON IMAGE DATA OF A SELECTED EYEGLASS FRAME

The present invention relates to a method, an apparatus, and a computer program product for an improved automated determination of individual geometrical parameters for customization of a spectacle lens for a user.

To produce spectacle lenses for correcting a refractive error, a computational optimization of the spectacle lens surfaces for a particular wearing situation, i.e. in particular an expected object distance or object distance model, and a specific wearing position of the spectacle lens or lenses, i.e. a specific position of the spectacle lens or lenses in front of an eye or the eyes of a spectacle wearer, has long been performed prior to the spectacle lens being manufactured according to the optimized surfaces. The computational optimization is performed using ray-tracing, for example, i.e. a calculation of the progression of light rays from the object point through the spectacle lens up to the respective eye of the spectacle wearer or a corresponding reference surface (e.g. vertex sphere of the eye). Alternatively or in addition, including methods using wavefront tracing are used as well.

In any case, knowledge of the spectacle lens's position in front of the respective eye of the spectacle wearer is required for a precise customization of the spectacle lens. Where standardized values of the wearing position on the basis of mean values for different users (spectacle wearers) and different spectacle frames were used to optimize spectacle lenses, it has been possible for some time to individually take into account the wearing position for each individual wearer due to a now substantially increased computing power of the available optimization systems and due to significant technological advances in optimization processes. To this end, it is now required to determine the individual wearing position of the spectacle lens in the desired frame for the respective user as accurately and reliably as possible. Errors in the determination of the individual wearing position immediately result in a deterioration of the customization of the spectacle lens.

The wearing position of spectacles on the head of a test person (user) or of the spectacle lenses arranged in the spectacles depends on a plurality of parameters or is described by a combination of a plurality of parameters. For example, the wearing position depends on the user's pupillary distance, the face form angle, the spectacle lens pantoscopic angle, the frame shape, the corneal vertex distance of the system of spectacles and eye, and on the fitting height of the spectacle lenses. These and other parameters that can be used to describe the wearing position or that are necessary, are included in relevant standards, such as DIN EN ISO 1366, DIN 58 208, DIN EN ISO 8624, and the DIN of 5340. Moreover, it is required for the spectacle lenses to be arranged or centered in a spectacle frame according to the optical parameters used for the production, so that the spectacle lenses are actually worn in the wearing position according to the optical parameters.

A plurality of measuring instruments is available to an optician to individually determine the optical parameters. For example, the optician can evaluate pupillary reflexes or determine the distance of the pupil centers with a so-called pupilometer to thus determine the pupillary distance. Pantoscopic angle and corneal vertex distance can e.g. be determined with a measuring apparatus in which, in the habitual head and body posture of the customer, the measuring apparatus is held on a frame plane of a spectacle frame. The pantoscopic angle can be read laterally via a gravity-driven pointer by means of a scale. An engraved ruler is used to determine the corneal vertex distance; the distance between the estimated groove bottom of the spectacle frame and the cornea also being measured from the side with said ruler.

The face form angle can be determined, for example, with a measuring instrument on which the spectacles are placed. Here, the nasal rim of a glass must be arranged over a pivot point of a movable measuring arm, with the other glass being parallel to an engraved line. The measuring arm is adjusted such that a distinguished axis of the measuring arm is parallel to the frame plane of the glass arranged above it. The face form angle can then be read on this scale subsequently.

Significant progress in determining individual parameters, in particular also parameters of the individual wearing position, arose with the development of computer-aided video centration systems. They enable a largely automated verification and determination of the position of a spectacle lens in the wearing position in front of the user's eye. Here, by means of one or more cameras, preferably three-dimensional image data of a user with the desired spectacle frame in the individual wearing position is generated and evaluated for the determination of the required parameters.

To determine the required parameters for a precise customization of the spectacle lens to be manufactured as accurately as possible, precise knowledge of the individual position of the spectacle lenses or the frame rim or the support glasses is desirable. The position of the inner rim of the frame or the outer rim of the fitted or to-be-manufactured lenses or support glasses in front of the eyes of the user (spectacle wearer) has to be determined at least at some relevant or striking points of the spectacle frame. To this end, manual and (semi-) automatic methods exist; with their help, said position is selected and set in the image data, which have been created by means of the mentioned video centration systems. Such striking points that allow a direct or indirect conclusion as to the location of the spectacle lens to be produced can be striking points of the frame desired by the spectacle wearer, which the spectacle wearer wears during the creation of the image data. In particular, light reflections on the frame rim can be used for this purpose. But also marks (e.g. in the form of calibration clips) could be used for this purpose.

The manual selection of the inner frame rim in shots of video centration systems is relatively time-consuming and only feasible with limited accuracy, under certain circumstances, due to the variety of possible edges and the sometimes complex course. An automated determination is often inaccurate, not very stable and error-prone for similar reasons, as well as due to the variety of frame types (e.g. rimless spectacles, Nylor spectacles, full rim frames made of metal or plastics). Experience shoes that a determination in rimless and Nylor spectacles is particularly difficult in image recordings of video centration systems, as here the outer edges must be recognized by transparent support glasses.

DE 10 2009 004 383 A1, for example, provides a particularly effective approach for a most precise evaluation of the shape and position of the rim of the spectacle lens or the frame rim to be produced from the image data of a video centration system. This document proposes a special combination of lighting apparatus and image acquisition apparatus (cameras). This allows an improved automatic or simplified manual selection of the frame rims by a creation or an increase of specific reflections on the spectacle frame during recordings in the video centration system. However, the reliability and accuracy of this system strongly depend of the shape and reflectivity of the desired frame. Especially if, for example, several reflexes occur simultaneously in the area of a frame groove, this can adversely affect the accuracy of determining the shape and position of the spectacle lens to be produced, and hence also the accuracy of the determination of the parameters required for the customization of the spectacle lens.

For example, DE 10 2011 115 239 A1 discloses a further approach to the determination of user data. It suggests using a so-called tracer data set, which so far only served for edging, i.e. for fitting the spectacle lens to be produced in the desired frame, also for more easily finding contour points of the rim of the spectacle lens to be produced in user image data created by a video centration system. To this end, it is necessary to provide this tracer data for the selected spectacle frame already in advance with the help of a so-called tracer, i.e. an apparatus for mechanically or optically scanning the spectacle frame or the support glass.

Against this background, it is an object of the present invention to make the determination of the individual parameters for the wearing position required for the customization of a spectacle lens to be produced even easier and more precise. This object is solved by a method and an apparatus with the features specified in the independent claims. Preferred embodiments are subject of the dependent claims.

Thus, in one aspect, the invention provides a method of determining user data for the production of a spectacle lens for a selected spectacle frame for a user. The method comprises providing a spectacle frame image data set of the selected spectacle frame. As defined in this description, an image data set is understood to be a set of digital, i.e. binary encoded data, which can be generated by means of a digital camera when taking a picture, for example, and can be presented visually as an image or photo by digital-to-analog conversion. Accordingly, a spectacle frame image data set as defined in the present invention is a set of binary encoded data of a spectacle frame, which can be generated by photographing the spectacle frame (i.e. such ones or also provided with support glasses and/or spectacle lenses) independent of image data of a user (spectacle wearer). Thus, the spectacle frame image data set is created independent of further image data of a video centration system, in particular independent of the later-described user image data. The spectacle frame image data set can also include additional data, such as dimensions or sizes of at least some parts of the spectacle frame and/or data on a scaling and or data on a scaling factor.

Preferably, the spectacle frame image data set is deposited in a data storage of an apparatus according to the invention to be used later for evaluating user image data. Alternatively or in addition, a spectacle frame image data acquisition apparatus is in signal connection with a video centration system for transmission of the spectacle frame image data set, so that the spectacle frame image data set can be used for subsequent evaluation of individual parameters of the wearing position for the spectacle lens to be produced from the user image data.

Moreover, the method comprises collecting user image data of at least a section of the user's head together with at least part of the selected spectacle frame worn by the user. Thus, image data of a section of the user's head, in particular including the eye area, is created along with the selected spectacle frame in the individual wearing position. This step can be performed analogously to the image data acquisition in conventional video centration systems. Preferably, the user image data is created by means of one or more digital camera(s). Here, the user is given e.g. at least one direction of sight and/or at least one head posture and/or one head position, to be able to capture all required parts of the face by means of a predetermined, mounted user image acquisition apparatus on the one hand, and to provoke the user to assume a habitual head posture on the other hand.

Since generally neither the exact individual head posture nor the individual wearing position of the spectacle frame or spectacle lenses in front of the eyes of the user are stipulated or known in advance, the position and location of the desired spectacle frame depicted in the user image data (e.g. of a video centration system) are not (exactly) known in advance. Both the manual and the automatic selection of the lens rim(s) from the user image data according to the conventional approach involve the aforementioned disadvantages of high effort/expenditure and a partially not inconsiderable inaccuracy.

The method according to the invention, however, comprises searching and finding the user's pupils in the user image data and determining a pupil data set—unlike conventional methods. The pupil data set preferably includes location information or coordinates of the pupils. Alternatively or in addition, the pupil data set can also include other data on the user's pupils, such as the size or shape of the pupils, or the relative distance of the pupils.

Searching of the pupils can include, in a first step, searching of areas having a relatively high texture. For example, forehead and cheek have a relatively low texture, whereas the eyes and also the eyes with spectacles worn have a higher texturing. In the regions of higher texture, circular structures can be sought in a second step. Here, different pupil models can be used. For example, a closed circle can be used as a pupil model to find a completely visible iris. Alternatively or in addition, one or more cut circles can be used as a pupil model to allow a search for an iris that is partially covered by a lid. If a circular structure is found, its center can be assumed as the pupil center, for example. Alternatively or in addition, a center can be assumed by fitting a second-order surface in a gray image of the circular structure. The pupil is very dark inside the iris, and, with the iris, the intensity increases to the outside within the circular area. Generally, it can be advantageous to perform the analyses in grayscale images to minimize the influence of skin and eye color.

After the pupils were searched and a corresponding pupil data set was determined, contour points of the rim of the spectacle lens to be produced are determined in the user image data based on the spectacle frame image data set and the pupil data set. The pupil data set, i.e. in particular the coordinates and/or the relative distance of the pupils, serves to search and find the spectacle frame in the user image data. In particular, the search area can be limited with the pupil data set in an advantageous way, which allows a faster search. Preferably, the pupil data set is deposited in a data storage of an apparatus according to the invention to be used later for evaluating user image data.

When determining contour points of the rim of the spectacle lens to be produced in the user image data, use is made in particular of those pixels of the user image data that together describe a geometric shape, which by translation and/or rotation and/or scaling and/or projection (e.g. parallel projection or projective translation) results from the course of the rim of the spectacle lens to be produced that is recognizable in the spectacle frame image data set, and that in their entirety stand out in contrast and/or color from their surrounding. This is done by a computer-aided image recognition. Here, in particular by a pattern search ("pattern matching") or "template matching" in the user image data the shape of the frame rim or a support glass as a picture element is searched for, with the spectacle frame image data set describing the pattern or template to be searched.

Even if searching for the pupils requires an additional step compared to conventional methods, the method according to the invention can performed more effectively, faster, and more reliably as a whole. This is in particular due to the fact that the search in conventional methods is relatively cumbersome due to the low contrast of the spectacle frame with respect to the environment. By contrast, the pupils of the test person provide a very good contrast to the environment, which makes the pupils quick and easy to find. With the help of pupil data thus determined, the spectacle frame or parts thereof can be found considerably faster in the user image data, so that significant time savings can be achieved overall.

Moreover, also searching and finding of the test person's pupils can be performed in a computer-aided or automatic way by using corresponding image recognition algorithms, so that the additional step of searching the pupils is of no consequence in temporal terms.

Other than in conventional methods, in the approach according to the invention, a free search for relevant points or a contour line of a spectacle lens rim or an (inner) spectacle frame rim with a priori unknown shape, which in an individual case can be quite incorrect and/or incomplete depending on the contrast of the user image data, is not required here. Instead, properties or characteristics of the spectacle frame, such as shape, color, contour strength, possibly present patterns, etc., precisely known from the spectacle frame image data set are used to search for image structures in the user image data which, except for corresponding transformations (e.g. translation, rotation), correspond to these well-known properties or characteristics. Thus, with the use of the spectacle frame image data set, gaps in the rim course of the spectacle lens or frame recognizable in the user image data, which occur in the user image data due to low local contrast, can be closed very reliably and precisely. Further, a higher accuracy in determining the exact position of the spectacle lens to be produced is achieved by providing the spectacle frame image data set, as it is possible to more reliably determine and discard e.g. misleading reflexes of the frame rim due to the form of the groove with closely located edges.

The present invention thus improves the reliability and accuracy of the in particular automated selection compared to the known methods—even under unfavorable conditions. In particular, not only the shape course of the spectacle lens can be used based on the spectacle frame image data set, but also other properties or characteristics, such as the color scheme, structuring, possibly present patterns, the spectacle rim thickness and/or other distinctive features of the spectacle frame that are detectable by means of image data. The provision of a spectacle frame image data set thus represents a clear advantage in terms of precision and reliability compared to the provision of a tracer data set, which is only composed of coordinates for the rim course of the spectacle lenses to be manufactured. Also for specific applications in color or finishing consulting as part of frame consulting, detection of shape for center thickness minimization, or determination of the position of additional elements, such as insets or visible trademarks, does the invention offer a major advantage by the very exact determination of the full shape and position of the spectacle lens rim in the user image data.

The inventors realized that the approach according to the invention, by using the proposed spectacle frame image data set in determining the spectacle lens rim in the user image data, does not only lead to a significant improvement in precision and reliability, but on the other hand does also not require any special additional effort for the optician, but possibly only a change in workflow. In particular, the tracer data necessary for the fitting of the spectacle lens can be determined from the spectacle frame image data set as well, so that the hitherto necessary measuring of the spectacle lens or the support glasses using a tracer can be omitted. Preferably, after manufacturing the optical surfaces of the spectacle lens, the method comprises grinding the rim of the spectacle lens, i.e. edging, according to the tracer data set measured by a tracer or determined from the spectacle frame image data set.

Preferably, determining contour points of the rim of the spectacle lens to be produced comprises finding at least a part of the spectacle frame, in particular the bridge of the spectacle frame, in the user image data based on the spectacle frame image data set. Advantageously, the search for the bridge of the spectacle frame is performed in an image area between the user's pupils or, advantageously, the search for the bridge of the spectacle frame can be limited to an image area between the user's pupils. This makes the search more effective and faster.

In particular for rimless frames or Nylor frames, the search for the spectacle frame in the image can, in a first step, be restricted to a search for the bridge of the frame between the lenses, as it stands out well from the rest of the image and thus can be easily searched automatically. The search for the bridge, which can be extracted from the spectacle frame image data set in advance, e.g. by marking and/or framing the bridge in the image by the user, is particularly advantageous because the bridge is usually not covered by hair of the test person, for example. In addition, it is known that the bridge of the spectacle frame must be located between the pupils, so that the search area of the image can be restricted accordingly, which means great time saving. This leads to a faster and more accurate search.

Preferably, determining a pupil data set comprises detecting the pupillary distance. In addition, determining contour points of the rim of the spectacle lens to be produced is preferably performed using a scaling factor, which is estimated on the basis of a comparison of the detected pupillary distance with a standard specification, in particular a known average value, for the pupillary distance. The scaling factor is a conversion factor between a measure and/or between dimensions in the spectacle frame image data and a measure and/or dimensions in the user image data. With the help of the scaling factor, it is possible to compare and relate the user image data with the spectacle frame image data, in particular also with regard to specific dimensions of the spectacle frame. The scaling factor can be estimated by assuming, for the detected pupillary distance, a standard value, i.e. the standard specification for the pupillary distance. Thus, it is possible to assign an absolute or real length to relative lengths, e.g. parts of the spectacle frame and/or a pixel pitch in the user image data. If corresponding absolute or real lengths in the spectacle frame image data, i.e. if e.g. the absolute or real dimensions or lengths of corresponding parts of the spectacle frame and/or a pixel pitch in the spectacle frame image data, are known, the scaling factor can be determined. Therefore, the scaling factor specifies the ratio of the measure or the dimensions of at least parts of the spectacle frame in the user image data to the measure or dimensions of corresponding parts of the spectacle frame in the spectacle frame image data. In particular, the scaling factor specifies the ratio of pixel pitch in the user image data to the pixel pitch in the spectacle frame image data. The scaling factor particularly results from the search of the spectacle frame in the user image or in the user image data. The scaling factor can be determined with the help of an image processing algorithm and output if required. In particular, the scaling factor indicates how much the spectacle frame must be scaled to have the correct size in the user image or the user image data. If the scaling factor is known, the search for the spectacle frame in the user image data can be performed more easily, more efficiently and faster.

The scaling factor can initially be estimated on the assumption that the mean pupillary distance is about 64 mm, which corresponds to the standard specification for the pupillary distance. A thus estimated scaling factor is also referred to as a pre-scaling factor in the context of this description. A possible range of values of the actual scaling factor can thus be restricted or limited, since it is known that the distance of real pupils is always in a range between 30 mm and 90 mm. The possible range of values of the actual scaling factor in an automatic search can then be restricted to the range of about 0.5-1.5 with respect to the determined pre-scaling factor. As the user image data acquisition is substantially limited to the face of the test person, the range of values of the scaling factor can also be limited according to standard specifications for the face of a test person. In particular, it can be assumed that the captured user image covers a real area with lengths and widths between 0.1 m to 1 m. From the relationship of these lengths, i.e. 0.1 m to 1 m, and the real size of the spectacle frame picture, the possible range of values of the scaling factor can be limited. The determination of the real measures and dimensions of the spectacle frame, or at least parts of it, in the spectacle frame image data set, and thus of the size of the spectacle frame image, can e.g. be performed with the help of a suitably attached scaling in the spectacle frame image data acquisition.

When searching for the spectacle frame in the user image data, one can make use of image processing methods, for example edge detection. It is also possible to use a method that ensures the completeness of a contour, to determine the outlines of the spectacle frame for the two lenses, e.g. by means of the so called snake algorithm. For rimless spectacle frames, only a recognition of the non-transparent components, such as the bridge or the cheeks, can be performed.

Preferably, the method further includes determining at least one distinguished point of a user's eye from the user image data and determining individual parameters of the wearing position from the location of the determined contour points relative to the at least one distinguished point. Thus, the position of the spectacle lens relative to the user's head, especially relative to the corresponding eye, preferably relative to the pupil or the cornea, is determined in a particularly precise and reliable way. Since the wearing position can be evaluated in a much more precise way due to the determination of the contour points according to the invention, there is a positive effect on the precision of the optical adjustment of spectacle lens to be produced.

In a preferred embodiment, the at least one distinguished point includes at least one of the following points: the pupil center, the corneal vertex, at least one optically distinguished point of the iris, at least one optically distinguished point of the sclera. The individual parameters, which are determined from the position of the determined contour points of the spectacle lens rim relative to the at least one distinguished point, preferably comprise one or more of the following parameters:

Position of one or both spectacle lenses in the three-dimensional space, in particular relative to the head and/or relative to the corresponding eye and/or relative to the corresponding pupil of the user, especially for a given viewing direction (e.g. zero direction of sight);

Corneal vertex distance, in particular according to reference point requirement and/or ocular center of rotation requirement;

Monocular centering point distance;

Centering point coordinates;

Decentration of the centering point;

Spectacle lens pantoscopic angle;

Fitting height.

Alternatively or in addition, preferably further parameters of the wearing position not depending on the at least one distinguished point are determined from the user image data. Preferably, these additional parameters include one or more of the following parameters:

Lens distance

Lens or boxed center distance;

Face form angle.

Alternatively, these other parameters can also be set by the spectacle frame image data set.

Preferably, providing the spectacle frame image data set of the selected spectacle frame comprises collecting image data of the selected spectacle frame in front of a predetermined image background surface. Advantageously, the color of the image background surface is different to the spectacle frame to be captured, so that high-contrast and thus detailed image data can be collected. The image background surface can be selected to be homogeneous, preferably in a contrasting color to the spectacle frame, such as white. The image background surface can also be provided with marks and/or patterns. These can serve as a scaling or scale to determine the absolute size or dimensions of the captured spectacle frame, or parts thereof. By using different patterns of the image background surface, in particular automatic detection of the spectacle frame by means of image processing algorithms can be simplified or improved.

The method can further comprise determining and/or providing the measure and/or dimensions of at least parts of the spectacle frame on the basis of a scale.

By means of the scale, a known pixel pitch of a captured camera image can be converted into real lengths. Consequently, it is possible to determine the absolute or real measure, or absolute or real dimensions, of the spectacle frame.

The scale can be attached to the image background surface, preferably next to the spectacle frame to be placed. The scale can include a tape measure, marks of certain size and/or a known or predetermined pattern. The scale can be located substantially in a spectacle frame plane, i.e. a spectacle lens plane spanned by sample support glass and/or sample lenses of the spectacle frame, or in an earpiece plane spanned by the folded-out earpieces.

When the distance of a camera to the spectacle frame is known, scaling can be accomplished or obtained through calibration of the camera, or the scale can be attached in a different plane and corrected or adapted on the basis of the known distance to the spectacle lens plane.

The scale is preferably so designed or arranged such that is provides a tape measure in at least one direction in space. Preferably, the scale is designed or arranged such that it provides a tape measure in two preferably mutually orthogonal directions in space, which span the spectacle lens plane.

Preferably, the scale has a size in the range of about 50 mm to about 150 mm. A larger scale allows determining the measure or dimensions of the spectacle frame with a smaller error and is therefore preferred. Preferably, the scale has a contrast such that it is detected in the image captured by the camera, ideally automatically, and an allocation of pixel pitches to real distances in the plane of the scale can be computed.

The scale can be applied by means of common printing techniques or material processing, such as milling, drilling and/or etching. The scale can also be realized by functional elements, such as by the openings for the passage of the earpieces, to position the spectacle frame in a planar way.

Providing the spectacle frame data set can comprise creating a so-called shape model of the spectacle frame. The shape model describes or models the contours of the spectacle frame and can be used for the subsequent search of the spectacle frame in the user image data. The real size of the shape model of the spectacle frame is known by the scaling in the spectacle frame image data set. Preferably, in the spectacle frame image data set, an orientation of the position of the spectacle frame with respect to the scaling element or scale, and thus an angular position of the spectacle frame is determined as well.

Preferably, sample support glasses and/or sample lenses are mounted in the spectacle frame when capturing the spectacle frame image data. Such sample support glasses and/or sample lenses usually do not have any optical effect and are used in eyewear consultation for the purpose of fitting to the user. In a preferred embodiment, the spectacle frame provided with the sample support glasses and/or sample lenses can be illuminated with light that is recognizably or noticeably or substantially absorbed by the sample support glasses and/or sample lenses of the spectacle frame. In other words, the sample support glasses and/or sample lenses are illuminated with light having a wavelength range in which the sample support glasses and/or sample lenses have recognizably or noticeably or substantially absorbing properties. For example, light in which the absorption coefficient of the sample support glasses and/or sample lenses is greater than 5%, preferably greater than 10%, more preferably greater than 25%, even more preferably greater than 50%, and most preferably greater than 75% is used for illumination. In this way, it is possible to detect the shape of the sample support glasses and/or sample lenses, which is of great advantage especially for rimless spectacle frames.

Preferably, collecting the image data of the selected spectacle frame is performed with the help of at least one camera from different angles. This allows e.g. a determination of the face form angle. For example, multiple cameras (e.g. two) can be used, which each take a picture of the spectacle frame from various positions or angles. Alternatively, only one camera can be used, wherein a suitable projection of a second view into said one camera takes place in addition. Arbitrary digital cameras (e.g. a mobile phone or tablet) can be used. The distance of the at least one camera to the spectacle frame is preferably selected such that the camera's resolution is sufficient to capture the spectacle frame with a resolution of about 0.2 mm, preferably about 0.1 mm or better.

The image field of the camera is preferably adapted to typical spectacle frame sizes and has an extension of about 200 mm to 250 mm along a long side. In the case of a strong distortion of the camera lens used, it can be advantageous to choose a larger image field and to leave the rim regions of the camera unused. Thereby, the error caused by a spatially separated reading of the marks and the spectacle frame dimensions can be reduced. Preferably, the existing distortion of the camera lens is also corrected by an internal calibration.

When capturing the spectacle frame from the front, i.e. when capturing the spectacle frame by means of a camera, the optical axis of which being perpendicularly aligned to the surfaces of sample support glasses and/or sample lenses, the inner frame rim in the groove is preferably not determined, as is usual with tracers. Advantageously, neither a temporal nor spatial relation of the image of the spectacle frame to the customer whose individual parameters are to be determined is necessary. This means in particular that the customer, when wearing the frame for measuring, does not wear any other equipment by which they can be disturbed in their habitual head and body posture. It is also possible to take the picture of the spectacle frame and evaluate it only after collecting the user image data of the test person, to determine the individual parameters. In other words, the steps of providing a spectacle frame image data set and collecting user image data can be performed in reverse order.

Preferably, the method also comprises optimizing the spectacle lens for the determined wearing position. Here, a computer-aided calculation of the optical surfaces (or the at least one optical surface, i.e. front and/or rear surface) of the spectacle lens to be produced is carried out. This can be done, for example, in a known way by means of conventional optimization algorithms, e.g. on the basis of ray-tracing and/or wavefront-tracing methods, in an iterative manner, minimizing a target function. Therefore, this must not be explained in detail at this point. However, the optimization of the spectacle lens or lenses is now performed on the basis of the wearing position, which can be determined much more precisely and reliably by means of the present invention. Thus, this has a positive effect on the accuracy of the optimization process, i.e. on the accuracy of the adaptation to the user.

Moreover, the method preferably comprises manufacturing the optical surfaces of the optimized spectacle lens. In particular, the at least one optimized spectacle lens surface (front and/or back surface) is given the shape determined in the optimization step particularly by grinding. Known manufacturing methods can be used for this step as well, which is why this is not explained any further here.

Preferably, the thus-optimized spectacle lens is fitted into the selected frame, i.e. edged, according to the tracer data set measured by a tracer or determined from the spectacle frame image data set. Hence, the method preferably comprises grinding the rim of the spectacle lens according to the tracer data set measured by a tracer or determined from the spectacle frame image data set. Thus, in one aspect, the invention relates to a method of producing a spectacle lens. Conventionally, spectacle lenses are manufactured as raw-round lenses, i.e. with a circular circumference, or with a shape approximated to the final frame shape, i.e. the optical surfaces are optimized and produced before the spectacle lens is given its final rim shape for fitting into the desired frame. In this case, the "raw", in particular raw-round spectacle lens is transferred e.g. from the lens manufacturer to the optician, who subsequently rims the lens. At least as far as edging takes place automatically, the inner rim shape of the frame or rim shape of the support glasses is measured optically or mechanically in particular by means of a tracer. In addition or alternatively, the tracer data set can be determined directly from the spectacle frame image data set according to the invention, which saves the step of measuring with a tracer or offers a further control option. The measured or calculated values then serve for fitting the spectacle lens into the frame, i.e. for edging the spectacle lens.

In another preferred embodiment, it is not necessary to optimize and manufacture the spectacle lens individually. Instead, on the basis of the improved determination of the wearing position, it is possible to use ready-made lenses in a precisely adapted way. In this case, in particular on the basis of the individually determined wearing position, a suitable, non-edged spectacle lens is provided for the user and the selected frame by selecting it, for example, from a ready-made set of lenses according to the determined wearing position. This lens will subsequently be edged, preferably by analogy with the individually optimized spectacle lens according to the measured or calculated tracer data set.

In another preferred embodiment, collecting user image data comprises:
Collecting a first user image data set, which represents at least a portion of the user's head together with the selected spectacle frame worn by the user in a first direction of acquisition; and
Collecting a second user image data set, which represents at least a portion of the user's head together with the selected spectacle frame worn by the user in a second direction of acquisition different to the first direction of acquisition.

Particularly preferably, determining individual parameters of the wearing position comprises:
Determining a three-dimensional position of the at least one distinguished point of the eye on the basis of the first and second user image data sets; and
Determining three-dimensional positions of the contour points of the rim of the spectacle lens to be produced on the basis of the first and second user image data sets.

Preferably, user image data of at least portions of the user's head is collected or generated, which includes at least one distinguished point of a user's eye. In particular, at least first and second user image data is collected e.g. by means of first and second user image capturing apparatus, respectively, from different directions of acquisition. A three-dimensional position of the at least one distinguished point can be determined from the at least two user image data. Similarly, the three-dimensional position is determined preferably for each contour point on the rim of the spectacle lens to be produced on the basis of the two user image data sets. The at least two user image data sets can be collected by means of two user image acquisition apparatus (e.g. cameras) in particular at the same time or also successively by means of a single user image acquisition apparatus at different head postures or viewing directions.

Preferably, the collected user image data comprise a first user image data set that represents at least a portion of the head in a first direction of acquisition, and a second user image data set that represents a portion of the head in a second direction of acquisition. In a preferred embodiment, determining contour points of the rim of the spectacle lens to be produced is performed separately for each user image data set, i.e. for each direction of acquisition (perspective). But as the same spectacle frame image data set (particularly as a pattern or template to be searched for) is used for both user image data sets, also their assignment to each other is set automatically with the separately calculated contour points in the individual user image data sets via the respective corresponding data point of the spectacle frame image data set, so that the three-dimensional position can be determined directly.

In another preferred embodiment, the relative position and direction of acquisition of the first and second user image acquisition apparatus are known, and the first and second user image data sets are preferably generated at the same time. Thus, also the two transformations of the spectacle frame image data set for the search in the two user image data sets relative to each other are known. The information inherent to such a stereo camera system can preferably be used to make the search faster and safer.

While in one embodiment the three-dimensional position of all identified contour points can be determined, reference points for the spectacle lens, which are particularly comprised by the contour points or can be clearly derived from the contour points, are selected (semi-) automatically and/or manually and their three-dimensional positions are determined in another preferred embodiment. To determine individual parameters, it is at least partially unnecessary to explicitly evaluate the three-dimensional position of the entire course of the rim. Instead, the relative position of the spectacle lens to the corresponding eye as well as the relative position of the two lenses with respect to each other are uniquely described by a few coordinates (on the basis of the reference points) already.

Thus, on the one hand, the accuracy of the reliability of the position determination is increased by taking into account the entire rim course from the spectacle frame image data set when determining the contour points, whereas on the other hand, computational effort for the evaluation of the individual wearing position is kept little due to the subsequent selection of a few reference points, which already allow a clear determination of the (relative) position/location of the spectacle lens or lenses.

In another preferred embodiment, the provided spectacle frame image data set stipulates the course of the rims of the two spectacle lenses of the selected spectacle frame as well as their relative positions to each other (in particular three-dimensionally), wherein the method comprises determining the rims of both spectacle lenses of selected spectacle frame in the user image data based on the spectacle frame image data set. In this case, preferably also the relative position and/or orientation of the two to-be-produced lenses of the desired spectacle frame with respect to each other is determined as well. This is especially advantageous if the desired spectacles have a large face form angle. But also in the case of a small face form angle, the precision in the position of the determined contour points is further increased by fitting or pattern search on the basis of a combination of both spectacle lenses.

Preferably, the method further comprises displaying the user image data together with the determined contour points e.g. on a monitor similar to a monitor known from conventional video centration systems. Thus, a user can control the determined contour points on the one hand. On the other hand, frame consultation for the spectacle wearer is possible thereby.

In another aspect, the present invention relates to an apparatus for determining user data for producing an individual spectacle lens for a selected spectacle frame for a user. The apparatus comprises a data storage with a spectacle frame image data set. Moreover, the apparatus comprises a user image acquisition apparatus for collecting user image data at least of a portion of the user's head along with the selected spectacle frame worn by the user. Finally, the apparatus according to the invention comprises an evaluation device for determining contour points of the rim of the spectacle lens to be produced in the user image data based on the spectacle frame image data set. For the apparatus according to the invention, the above and following statements on the method of the invention are to be understood analogously.

Preferably, the apparatus further comprises a spectacle frame image acquisition device for collecting the spectacle frame image data set of the selected spectacle frame. Preferably, the spectacle frame image acquisition device preferably comprises an image background surface, in front of which the selected spectacle frame can be arranged. Advantageously, the image background surface stands out in color from the spectacle frame to be captured, so that high-contrast and thus detailed image data can be collected. Preferably, the image background surface is interchangeable or modifiable to optimally adjust the background to the selected spectacle frame. For example, if the spectacle frame is one with a dark (e.g. black rim), a bright (e.g. white) image background surface can advantageously be selected. By such an artificial background, compared to a realistic background as is preferably used in user image data acquisition, high-contrast and detailed images can be captured. Further, the image background surface can have different patterns or marks, which enable a simplified and more precise automatic finding of the spectacle frame by means of image processing algorithms and/or which serve as a benchmark for the determination of the size or dimensions of the spectacle frame (or parts of the spectacle frame). If sizes or dimensions are known, the spectacle frame can serve as a benchmark as well, so that a video-centering process can be performed at least partly without using a calibrated 3D stereo system or a frame attachment.

Moreover, the spectacle frame image acquisition apparatus preferably comprises fasteners or a bracket to fix the selected spectacle frame in front of the image background surface. The spectacle frame image acquisition apparatus preferably comprises a camera and lighting means. The camera can be an arbitrary digital camera. The lighting means can preferably emit light in different wavelength ranges, in particular light that is recognizably absorbed by sample support glasses and/or sample lenses of the spectacle frame. According to a preferred embodiment, the image background screen and the fasteners or brackets for the spectacle frame are located in a box. The lighting means and/or the cameras can be located inside or outside the box.

Preferably, the apparatus further comprises an image display device for outputting the user image data together with the determined contour points to the user. Thus, a user can control the determined contour points on the one hand. On the other hand, frame consultation for the spectacle wearer is possible thereby.

In addition to corresponding methods of determining user data for the production of a spectacle lens for a selected spectacle frame for a user, in particular including one or more of the corresponding method steps implemented as functional processes in the apparatus of the invention, the invention also provides a computer program product, particularly in the form of a storage medium or a signal sequence, comprising computer-readable instructions, which, when loaded into a memory of a computer and executed by the computer, cause the computer to perform a method according to the present invention, in particular in a preferred embodiment.

Figure 2:
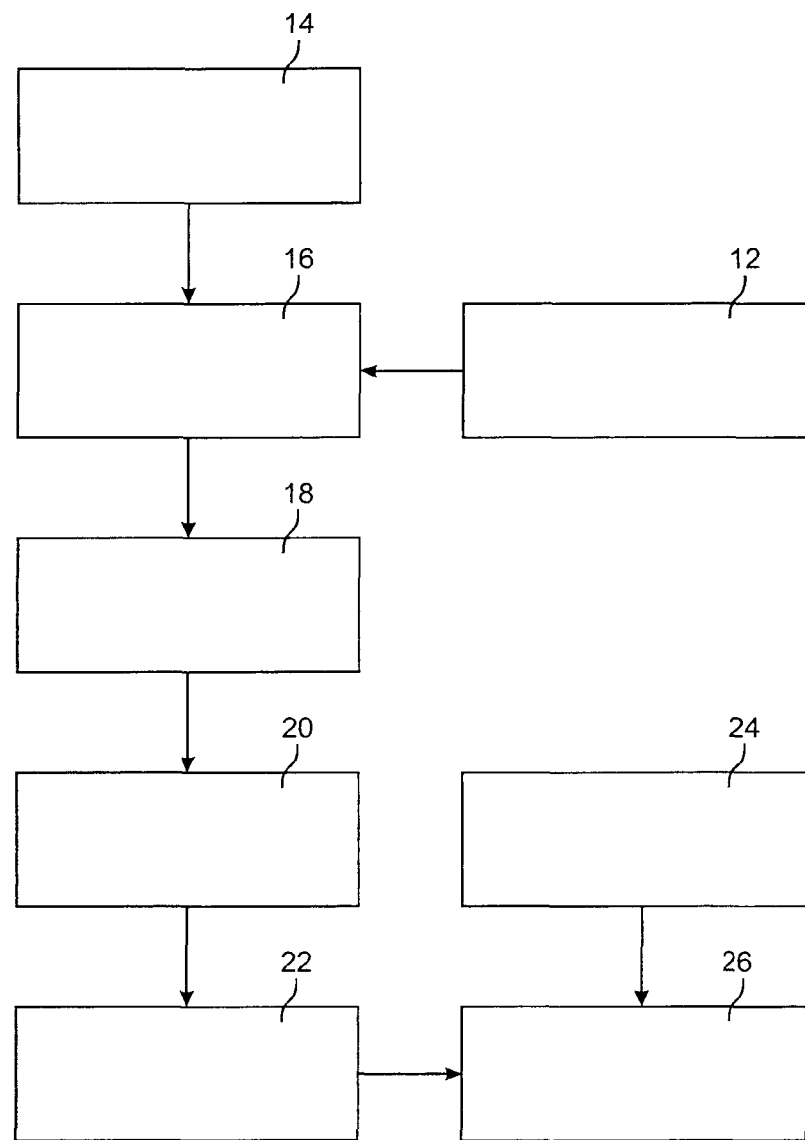
Figure 3:
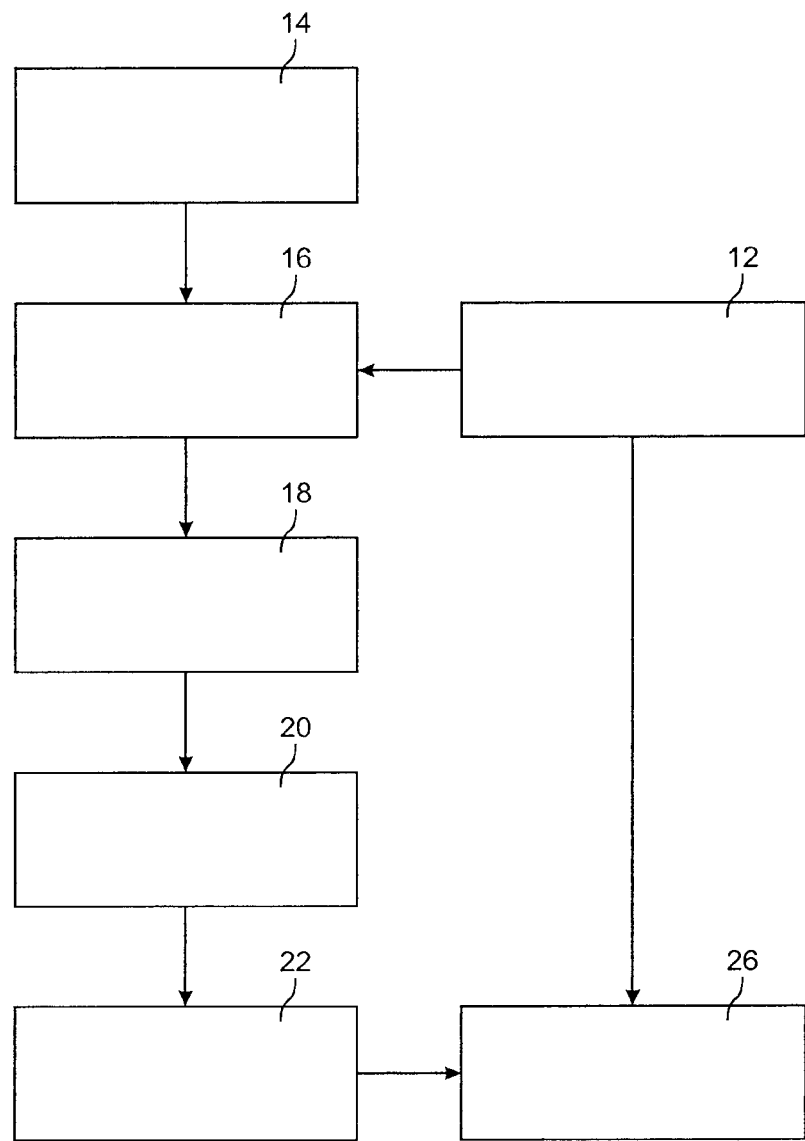
Figure 4:
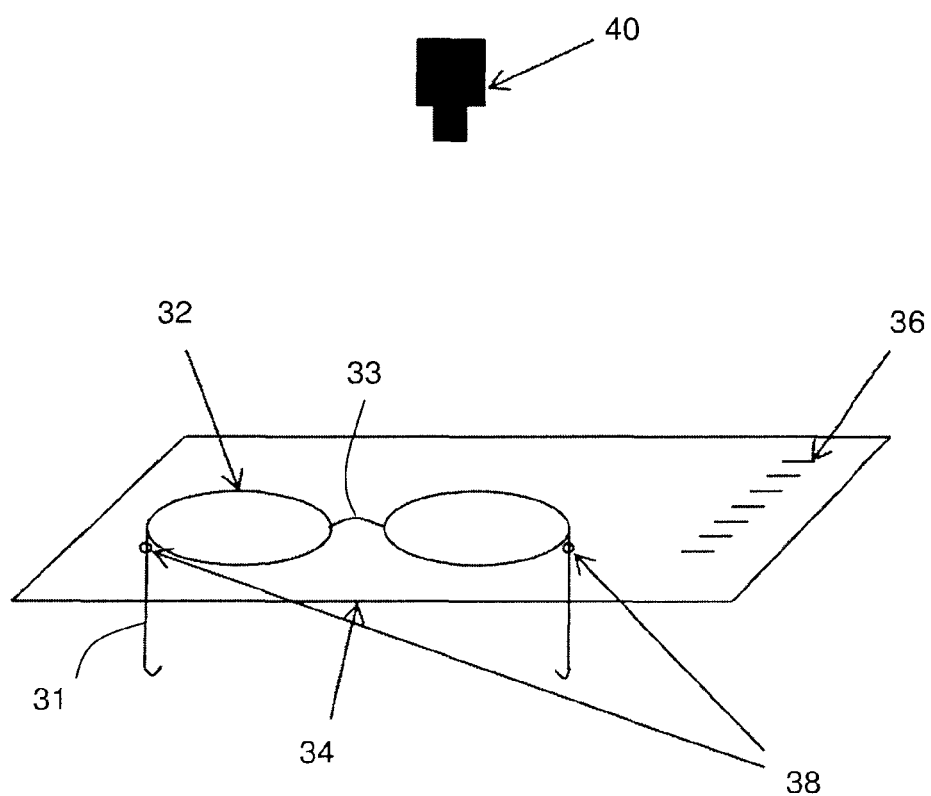
Figure 5:
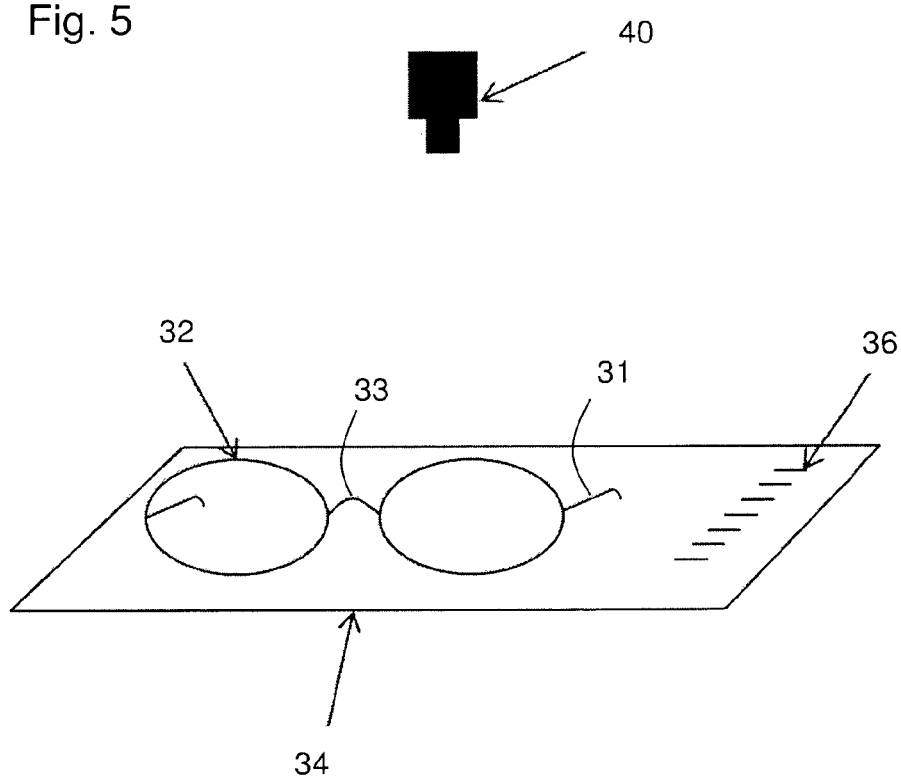
Figure 6:
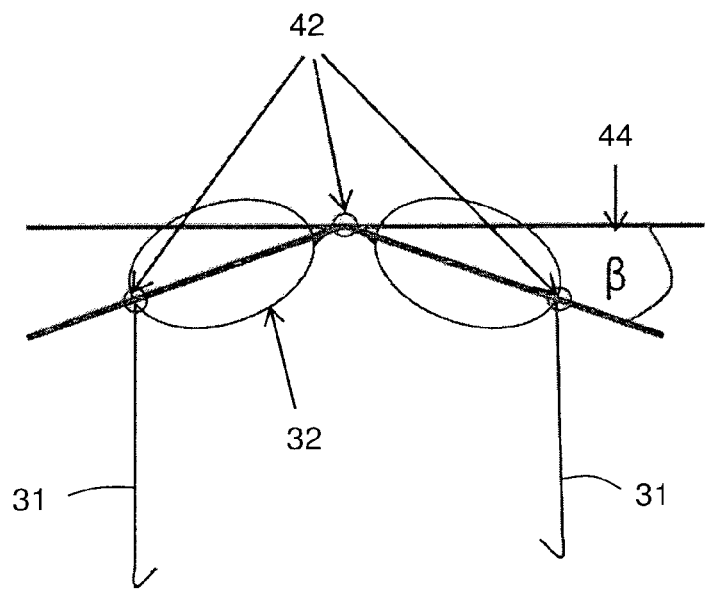
Figure 7:
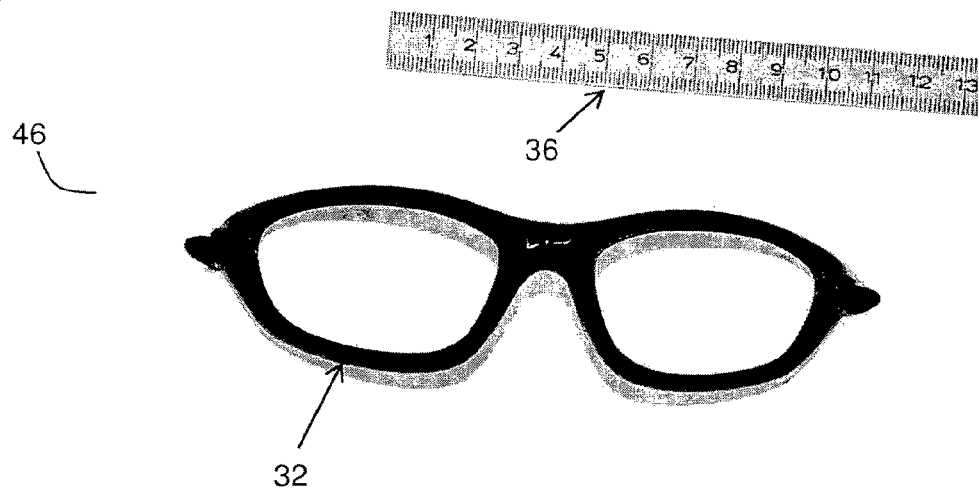
Figure 8:
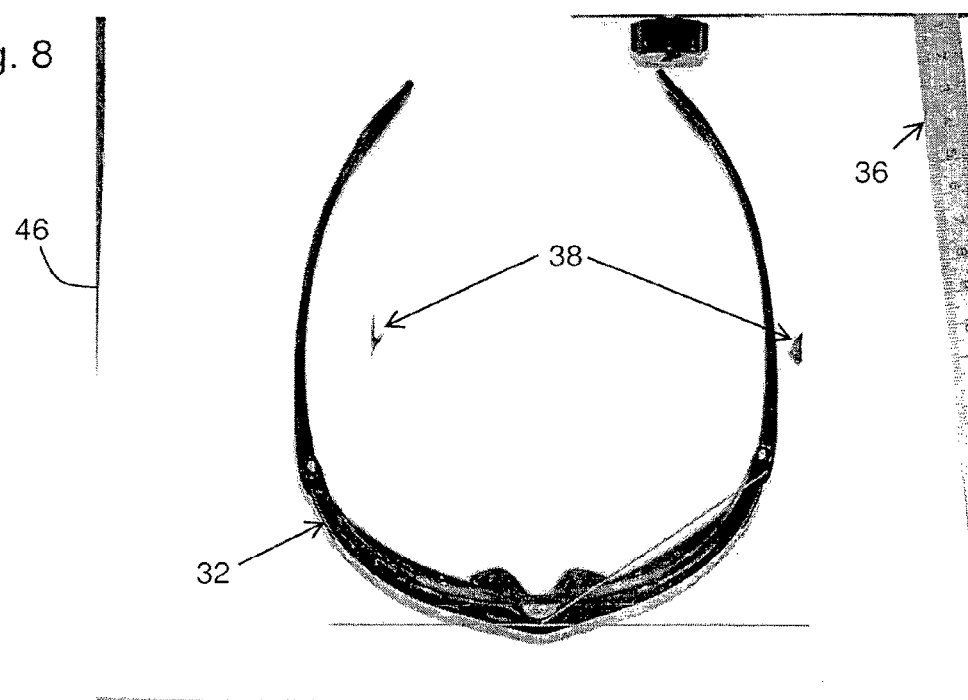
Figure 9:
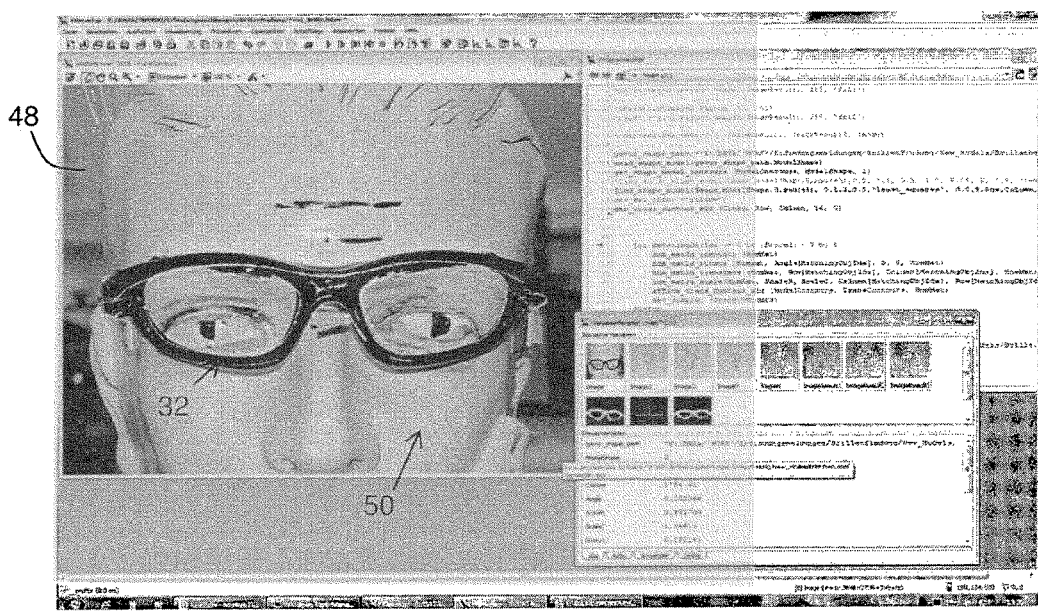

The invention will be described by way of example in the following on the basis of preferred embodiments with reference to the accompanying drawings, which show:

FIG. 1: a schematic representation of a method according to a first preferred embodiment;

FIG. 2: a schematic representation of a method according to a second preferred embodiment;

FIG. 3: a schematic representation of a method according to a third preferred embodiment;

FIG. 4: a schematic representation of a preferred embodiment of a spectacle frame image data acquisition device with vertically arranged and fixed spectacle frame;

FIG. 5: a schematic representation of a preferred embodiment of a spectacle frame image data acquisition device with horizontally arranged spectacle frame;

FIG. 6: a schematic representation of a collected spectacle frame image data set for determining the face form angle of a pair of spectacles;

FIG. 7: a photograph as a visual representation of a spectacle frame image data set;

FIG. 8: a further photograph as a visual representation of a spectacle frame image data set with superimposed lines for determining the face form angle;

FIG. 9: a photograph as a visual representation of a user image data set.

According to the preferred embodiment illustrated in FIG. 1, a method comprises providing a spectacle frame image data set (12). In the spectacle frame image data set, the frame is searched for on the basis of one or more properties by which frame and background differ from each other. Different image processing techniques can be used here.

The search can use a global threshold value of the property to make a distinction, for example. Also, more elaborate techniques, such as searching for edges, using a local threshold value, differentiation on the basis of areas in color spaces, etc. can be used as well.

The search for distinguished points on the frame is performed on the basis of a suitable target function. Based on the property used, the pixels can be assessed with the target function.

Distinguished points on the frame are unique points on the frame, which, largely independent of the viewing direction on the frame, indicate the same point on the frame in the projection of the image data. For example, the inner frame rim can be used as distinguished points. The generation of a complete frame contour can be either composed of individual points extracted by the search, or, based on a closed starting shape, customize this shape until the shape corresponds to the selected one (e.g. snake algorithm). The latter avoids problems when searching in areas with poor contrast. Especially in areas of low curvature, areas where no contour of the frame has been found, can be bridged by connecting the last boundary points with each other. Ideally, use is made of a parameterized function, which continuous e.g. the curvature of the found contour and forms a continuous connection. Other points on the frame can be used in addition to the inner frame rim. In rimless spectacles, this can be the boreholes. For later referencing in the image of the video centration system, at least two distinguished points are to be selected.

For example, the shape of the course of the rim of at least one spectacle lens to be produced for a selected spectacle frame (32) can be determined using known image processing algorithms. The course of the rim of the spectacle lens substantially corresponds to the inner frame rim of the selected spectacle frame (32). In rimless frames, the inner frame rim is understood to be the rim of the support glasses or the lenses to be integrated later. This applies mutatis mutandis to rimless and Nylor spectacles. In frame rim detection for video centration, it is especially useful to select the edge of a frame or of a supporting glass to which the centration data for the subsequent process up to the fitting are to be referenced.

For example, the spectacle frame image data set can be generated by the optician individually for a selected spectacle frame (32), especially after the user (50) selected the spectacle frame (32), by photographing the selected spectacle frame (32). Such data have the advantage that they reflect the actual shape of the specific selected specimen of the frame based on the individual determination, and therefore take into account possible deviations, if only little, from other copies of the same model.

However, the spectacle frame image data set can also be generated by the manufacturer of the respective spectacle frame model and be provided to the optician. The spectacle frame image data set is thus provided for the selected frame model irrespective of the specific specimen to be detected. The advantage of this option is the low effort for the optician during the consultation, measuring, and ordering process. Here, the data can be collected centrally on a specimen of the frame or be determined locally once on a specimen by the optician.

Moreover, the method according to the embodiment illustrated in FIG. 1 comprises collecting user image data (14) of at least a portion of the head of the user (50), in particular an eye area, together with the selected spectacle frame (32) worn by the user (50). This process can be performed by analogy with the image acquisition in known video centration systems. Here, the user (50) is requested to wear the selected spectacle frame (32) in the desired wearing position and to perform a certain visual task, for example. In other words, the user is requested to move to a specific position in front of a camera (40) and, where appropriate, to look into a certain direction. The user image data is generated by means of the at least one camera (40). The data represents at least a section of the face (in particular an eye area) relevant to the customization of the spectacle lens or lenses along with the worn spectacle frame (32). Preferably, the user image data substantially represents the entire face and is used also for frame and lenses consultation, as is also already performed in known video centration systems. Step (14) further comprises finding the user's pupils in the user image data and determining a pupil data set. A pre-scaling factor is obtained from the found position of the pupils and the on the assumption of a standard distance of the pupils of, for example, 64 mm. With the help of a pre-scaling factor and knowing the real size of a shape model of the spectacle frame (32), i.e. knowing the real sizes of the contours of the spectacle frame (32), the size of the shape model, for example in pixels, can be assumed in the user image data. The pre-scaling factor can be used as a starting parameter for the search of the optimal location of the shape model. As the starting parameter must only be varied or adapted by the pre-scaling factor in a small area, the search process can be accelerated thus.

In addition to the scaling factor of the shape model, also the locational positions in x and y image coordinates and the angular position of the spectacle frame (32) about a horizontal and vertical axis through the spectacle frame (32) can be determined by image processing algorithms. For these parameters as well, assumptions on the basis of the position of the pupil can be made first. To this end, for example the discs or glasses included in the spectacle frame image data set, in particular their dimensions or sizes, can be used. Thus, for the search of the spectacle frame (32) it can be assumed that the pupils are in the middle of the glasses. Finally, the locational position can be varied such that the pupils are always within the glasses. In addition, on the basis of the location of the pupils in the user image, an angle restriction about the vertical axis can be assumed when searching for the optimum location of the shape model. To this end, however, the alignment of the spectacle frame (32) must be included in the spectacle frame image data set. For example, one can assume that the pupils have approximately the same horizontal alignment as the spectacle frame (32). For example, if it is determined that the pupils in the user image data set are offset or tilted with respect to the horizontal by a certain angle, this angle can also be used as the starting angle for the shape model of the spectacle frame (32). In particular, the angle for the shape model can be restricted to a narrow range of values, as the deviation of the actual or real angle relative to the starting angle will be clearly less than +/−90°. By the above-described approach, finding the spectacle frame (32) in the user image can be simplified and/or accelerated significantly.

In a next step (16), the method now searches for image elements of the spectacle frame (32), which correspond to those in the spectacle frame image data set, in the user image data. For example, the rim of the spectacle frame (32) or the rim of the support glasses or lenses can be searched for. Alternatively or in addition, the bridge (33) of the spectacle frame (32) can be searched for. The search can be performed either by image processing in image data or—more abstractly—in a data set in which the relevant data are available in an extracted and prepared form. Helpful descriptions of some search algorithms mentioned in the following, of the basics of pattern (or template) matching, and the definition of appropriate target functions can be found in textbooks of artificial intelligence, such as S. Russel and P. Norvig "*Artificial intelligence: A modern approach*", Prentice Hall, $3^{rd}$ edition (2009) and of image processing, such as C. Steger et al.: "*Machine Vision Algorithms and Applications*", Wiley-VCG (2008).

In the simplest case, the spectacle frame image data set is searched according to the principles of pattern (or template) matching in the image data. To this end, both the data to be searched (and in special cases the image data) can be subjected to transforms during the search. Due to mapping of the three-dimensional space in the picture data plane, advantageously affine transformations such as translation, rotation, scaling, reflection, and shear as well as parallel projections and (non-affine) projective translations such as the central projection are used in the manner familiar from literature here. The parameters of these transformations are systematically varied and the thus-transformed pattern (or template) is repeatedly laid over the search area. Thus, the correspondence between pattern (or template) and excerpt from the search space is calculated according to a target function.

The position (i.e., the parameter set for the affine or projective transformation) with the highest value is considered a successful result of the search, if it is above a given threshold. Naturally, the methods known from the field of artificial intelligence can be employed. Examples include heuristic algorithms, optimizing processes, genetic algorithms, and simulated cooling (simulated annealing).

For example, a template of the spectacle frame can be created from the spectacle frame image data set. This template can then be searched in the user image or in the user image data using a search algorithm.

For example, a contour-based method can be used as a search algorithm. For this purpose, the template contains contours that are searched in the user image or in the user image data. This contour-based method searches for edges and transitions in the template or image. There are different approaches to detecting edges. In particular, contour-based methods are particularly suitable for performing searches with different rotations and/or different lighting between template and image. In mere pattern-matching methods, in particular different lighting can be problematic. Therefore, a contour-based method is advantageous in searching the spectacle frame in the user image. Advantageously, in the contour-based search method, also a scale or a scaling factor can be used. As such scaling factor can be restricted to a specific, in particular small value range and thus the search area can be reduced according to a preferred embodiment of the inventive method, the search process can be speeded up significantly.

Very generally, the method according to the invention can clearly accelerate a search algorithm in which scalings and/or rotations can be taken into account, by restricting the possible value ranges of the scaling and/or rotation. In particular by the step of searching the pupils, a scaling factor can be determined and its range can be restricted, which leads to a faster finding of the spectacle frame in the user image data. Restricting the rotation angle range due to the previously found pupils leads to a faster result as well.

To make the search faster and more stable, the image data can be prepared before the search. These include the typical operations of image processing, such as adjusting contrast and brightness, color space transformations, the use of adjusted color spaces, the restriction to individual color channels, and the like. But also more complex operations, such as sharpening, the application of filters, and extraction of edges belong to this category, as long as the results are in turn image data in the broadest sense.

To save computing time, the search can take place successively in differently prepared search spaces. In this way, the approximate position of the frame rim (i.e. parameters of the above-mentioned transformation) can be determined in a first, more coarsely rasterized search space. In the surrounding of said search space, the exact position can then be determined in a search space with a finer resolution.

Derived data or image data is understood to be a data set in which the relevant data exists in an extracted and prepared form. An example of this is the indication of edges. These are extracted by means of image processing and then stored specifying their coordinates. In the simplest case, this leads to modeling of the edge through a point cloud and to specification of the individual coordinates.

The preference is for an analytical specification, in which individual elements (such as straight lines, radii, or splines) are extracted from the point cloud and stored in a more abstract description (such as starting points, support points, lengths, radii, directions, tangents, tangential planes, enclosing planes, normals, coefficients of functional interactions).

In the simplest case, the search is performed on the basis of derived data by analogy with one of the above search methods (e.g. pattern (or template) matching) for the direct image data. The optimum position of derived data of the spectacle frame image data set in the derived data of the user image data (i.e. the parameter set for the transformations) is determined by appropriate search strategies for optimizing the target function with variation of the parameters of the transformations. Of course, other metrics and calculation methods are possible.

The use of analytical data has the fundamental advantage that during the search, one or a whole set or parameters can be determined analytically as well, without the need for a search with variation of parameters and maximization the target function. For example, if a matching point of an element is found during a step of the search, the location of the element (i.e. the parameters of the corresponding transformations) can be calculated directly from the analytical description of the element. An example of this would be the calculation of rotation axes and angles in the allocation of an endpoint found.

Preferably, also handling missing elements is taken into account in the determination of the target function. By an appropriate evaluation of these sections, two types of mistakes can be avoided: The first mistake is that the algorithm prefers (obviously wrong) positions for the spectacle frame image data, in which one point matches in the proximity of which no other elements are present though. The opposite mistake occurs when incorrect elements in the surrounding of the gap of real elements "draw" the position of the spectacle frame image data in their direction to fill the gap by increasing the distance from the other elements. This risk exists especially when the image data have many edges that are close together due to the form of the groove. In the simplest case, a fixed value for the distance is defined. It can correspond to the maximum distance in the selection of the elements, for example Less sensitive to minor failures is a method in which the evaluation increases disproportionately to the length of the missing piece. As a result, missing pieces in the derived data of the user image data can be bridged easily by derived data of the spectacle frame image data, as they are usually fully available.

For stereo camera systems, it is generally possible to view both cameras independently of each other and to individually search for the frame rim in the image or derived data of each camera independently from each other. The information inherent to such a stereo camera system can preferably be used to make the search faster and safer.

As the imaging properties of the individual cameras as well as their arrangements with respect to each other (i.e. intrinsic and extrinsic parameters) are known, the affine or projective mapping into the image data set of both cameras can be calculated from the position of the pattern in the three-dimensional space. Accordingly, it is advantageous to not take the parameters of the imaging functions as a basis for the search, but to shift the pattern across the space (three translational and rotational coordinates and optionally a parameter to adjust the absolute size) and to compare the images of the pattern resulting from the respective positions to the respective image data sets of the respective camera.

To this end, also a common target function can be defined, which reflects the match of the pattern with both images. Weighting factors can be used to take the fact into account that the quality of the images can be different (also depending on the location or the perspective).

When searching in derived data, one can derive a data set for each camera—as described above. The model can then be searched therein according to the approach described above, however, this time combined with the described method of using the known camera parameters (if any) and three-dimensional data.

It is more advantageous to generate a three-dimensional data set from the data of the individual cameras, in which the individual elements (e.g. points, distances, radii, splines) from both cameras are assigned to each other and linked to form three-dimensional objects in three-dimensional space. Here, the above-described method (e.g. calculation of rotational axes and angles as well as translation vectors) can directly be applied from the two-dimensional space to the three-dimensional space. Suitable parameters are again the three translational and rotational parameters and—if necessary—a parameter for adjusting the absolute size. Projections are not necessary in this case anymore.

To minimize the search effort and thus the computation time, a limitation of the image data, the derived data, and of the search space can be made. In the case of a direct search in the image data, the search space is directly reduced by limiting the image data to specific areas. In the case of a search in the derived data, the amount of data to be derived and derived can be reduced as well. For example, the area of the face or a correspondingly extended eye area represents an appropriate limitation.

When searching in prepared image data or derived data, the preparation or derivation is additionally accelerated by a limitation of the original image data, as they only need to be applied to a reduced set of data. Regardless of that, a corresponding limitation can still be made in the prepared image data as well. This is especially true if it is more suitable for the detection of the relevant areas. The effort for the described derivation can be reduced also in case that derived data is used.

This restriction can be done manually (e.g. by spanning a corresponding form such as a rectangle) in image data presented. However, an area can be selected automatically or semi automatically by means of image processing. Criteria for an automatic selection can be features of the face (such as the area around the nose, the area around the eyes and the pupils, the area at the height of the ears, . . . ) or features characteristic of the frame (such as colors, shapes, line density, . . . ).

When using derived data, the search space can be further restricted by discarding e.g. edge elements that do not meet certain conditions (e.g. minimum or maximum radius of curvature, size and unity in the case of a complete contour), which the data to be searched have, prior to the actual search.

Both for the search in image data and the search in derived data can the parameter space be restricted. This can be accomplished for example by specifying crucial points. One or more points of the points corresponding to the spectacle frame image data from the user image data are allocated here. This cancels out the degrees of freedom of the translation. In the case of multiple points for an element, the degrees of freedom of the rotation reduce as well. Moreover, an approximate allocation (e.g. by specifying a range) is possible. This does not cancel out complete degrees of freedom, but the search space is greatly limited in the corresponding directions.

Further, an allocation (fix or approximately) in one dimension (or in two dimensions in the case of three-dimensional data) is possible. This is useful, for example, if crucial points can be allocated to individual pixels of the images, which are naturally projections. This allocation can be done manually, automatically (e.g. in an upstream step of the image processing) or semi-automatically.

Analogously to the allocation of points, directions of elements can be specified as well. For this, the above applies mutatis mutandis. It is also advantageous to connect the specification of one or more points with the specification of one or several directions.

The result can be displayed to the user (50) in the image data. This data can already be prepared for better visual recognition of the relevant edges in the above sense. Displaying can comprise illustrating the entire contour of the model or single (detected) elements thereof in the correct position.

Moreover, several possible positions can be displayed to the user (50). They can be displayed simultaneously or sequentially, wherein the user can switch between the different positions. This may include either a specified number of positions with the highest values for the target function or all positions in which the target function reaches a certain minimum value. Geometrically close positions can be combined here. The user is now given the possibility to choose one of these positions.

Further, the user can be given the possibility to adjust the position by performing slight shifts. When using multiple cameras and when three-dimensional information is available, the user can manipulate the position in the space and the result can be represented in the user image data of all cameras. Moreover, the user (50) can be given the possibility to slightly change the contour in order to adapt it to the actual frame. This is especially advantageous if the spectacle frame image data is not generated individually for the specific selected model and, where appropriate, the shape of the specific selected model deviates from the shape of the model used to generate the spectacle frame image data. For rimless or Nylor spectacles, the shape of the lens can be manipulated for manufacturing and edging as well.

On the basis of the contour points determined in this way, the individual wearing position of the spectacle lens or the spectacle frame (32) for the user (50) is preferably determined in a further step (18).

The result can be displayed to the user (50) in the user image data. This data can already be prepared for better visual recognition of the relevant edges in the above sense. Displaying can comprise illustrating the contour of the model in the correct position. Moreover, several possible positions can be displayed to the user (50). They can be displayed simultaneously or sequentially, wherein the user can switch between the different positions. This may include either a specified number of positions with the highest values for the target function or all positions in which the target function reaches a certain minimum value. Geometrically close positions can be combined here. The user is now given the possibility to choose one of these positions. Now, the user can be given the possibility to adjust the position by performing slight shifts. When using multiple cameras and when three-dimensional information is available, the user can manipulate the position in the space and the result can be represented in the image data of all cameras. Moreover, the user (50) can be given the possibility to slightly change the contour in order to adapt it to the actual frame.

If one uses the inner frame rim (frame contour) as distinguished points, the thus-prepared data for video centration can be used equivalently to individual tracer data to search for the corresponding form in the images of the video centration system. As the prepared data includes the absolute dimensions of at least two distinguished frame points, video centration with only one camera (40) without attachment to the frame is possible. The determined distance between the distinguished frame points serves as a benchmark for video centration.

FIG. 2 illustrates a method according to a second preferred embodiment. In addition to the above described steps according to FIG. 1, optimization of the spectacle lens (20) takes place after individual parameters of the wearing position have been determined (18). After the optimization step, the spectacle lens is grinded according to the optimization result particularly by an eyewear manufacturer, i.e. at least one optical surface (front and/or back surface) is individualized (22) preferably according to the optimization result.

In a preferred embodiment as an alternative to FIG. 2, it is not necessary to individually optimize and manufacture the spectacle lens. Instead, on the basis of the improved determination of the wearing position, ready-made spectacle lenses can be used in a precisely adapted way. In this case, in particular on the basis of the individually determined wearing position, a suitable non-edged spectacle lens for the user (50) and the selected frame is provided by selecting it, for example, from a ready-made set of spectacle lenses according to the determined wearing position.

Regardless of whether it is an individually optimized and manufactured spectacle lens or only a ready-made spectacle lens selected according to the determined wearing position of the selected spectacle frame (32), the lens is edged (26) subsequently. According to the preferred embodiment in FIG. 2, additional tracer data for the selected spectacle frame (32) is generated mechanically or optically using a tracer and provided for the edging step. According to the preferred embodiment in FIG. 3, the tracer data required for edging are determined directly from the spectacle frame data set, which eliminates the need for a separate use of a tracer.

FIG. 4 illustrates a schematic representation of a preferred embodiment of a spectacle frame image data acquisition apparatus. The spectacle frame image data acquisition apparatus comprises an image background are or background plate (34) having a scale (36), which can be realized as a tape measure, marks of a certain size, one or more known patterns, etc. Openings are formed in the background plate (34), which serve as fasteners or brackets (38) of the spectacle frame (32). The earpieces of the spectacles can hang through the openings, so that the spectacle frame (32) is fixed thereby. With the help of a camera (40), for example a digital camera, a camera of a tablet or an iPad, a webcam, a mobile camera, etc., an image of the spectacle frame (32) and be captured and a spectacle frame image data set can be produced.

The rim and/or the color of the spectacle frame (32) can be gathered from the spectacle frame image data set. Due to the scale (36) attached to the background plate (34), the exact measurements of the spectacle frame (32) are obtained. Finally, this information can be used in a user image of a user (50) who wears the spectacles, to find the spectacle frame (32) in the user image (e.g. according to color and shape). From the known dimensions of the spectacle frame (32), e.g. the pupillary distance can be measured by selecting or automatically finding the pupils and determining the distance via the scale (36) in the spectacle frame image data set. In particular, the spectacles themselves can be used as a scale and thus replace an attachment that is conventionally used.

The spectacle frame (32) is captured with at least one camera (40). Capturing can be performed two-dimensionally or three-dimensionally. If the frame is captured two-dimensional, the camera (40) is positioned so that the entire spectacle frame (32) comes to lie in its image field. The spectacle frame (32) is especially positioned so that the spectacle lens plane is substantially perpendicular to the optical axis of the camera (40). In the case of a three-dimensional capturing, this can be different for a second or further camera. A three dimensional detection can also be performed with only one camera (40) by taking images from different viewing angles. To this end, e.g. the object to be captured can be rotated.

The background from the perspective of the camera (40) behind the spectacle frame (32) is selected so that the frame clearly differs therefrom in a property that is present in the image data (e.g. brightness, phase, color, etc.). Here, the background can be homogenous. For optimal lighting, the background itself can be a light source (e.g. lighting panel). However, the background can also be structured, and this structure can be changeable temporally in addition. The combination of different shots with different backgrounds can be used to create a combined image, in which more suitable properties for distinguishing the frame exist (e.g. phase contrast) or appear more strongly (e.g. extension of the dynamic range of the camera (40) by bracketing).

In addition, use can be made of a lighting (not shown in the figures) that illuminates the frame in a structured way on the camera side. Information on the location of the spectacle frame (32) can be obtained from the known information on the structure of the lighting and the detected lighting in the spectacle frame image acquisition apparatus. This lighting may be realized by one or more laser beams, which head for predetermined points either locally set or at a defined speed. For determining absolute sizes in the image, either the distance of the spectacle frame (32) can be kept constant and, by a previous calibration of the camera (40), for this distance, the difference of a number of pixels can be allocated to an absolute distance. Or, as another component in the image, a scale having the same distance to the image acquisition apparatus as the spectacle frame (32) can be visible. From the extraction of the scale marks and the known absolute distance can a distance in a number of pixels be converted to an absolute distance.

The images present in this way can be used with image processing for searching the spectacle frame (32).

FIG. 5 illustrates a schematic representation of a preferred embodiment of a spectacle frame image data acquisition apparatus, wherein the spectacle frame (32) with folded-out earpieces is arranged on the background plate (34) such that the spectacle lens plane is substantially parallel to the optical axis of the camera (40). By photographing the spectacle frame (32) in this arrangement, the face form angle β (44) can be determined from the captured image. The determination of the face form angle β (44) can be performed on the basis of the collected spectacle frame image data set visually displayed on a monitor in particular by the optician selecting or clicking specific points of the spectacle frame image data set. By selecting this click positions (42) in the image, the face form angle (44) can finally be calculated and output automatically.

A corresponding schematic drawing of the visual representation of the spectacle frame on the basis of the collected spectacle frame image data set is shown in FIG. 6. By selecting or clicking the three click positions (42) illustrated in FIG. 6, the face form angle β (44) can be determined. In particular the two intersection points of the earpieces with the spectacle frame rim and the spectacle frame center in the spectacle lens plane are suitable as the three click positions. The click positions can be clicked e.g. manually by the optician or be determined automatically by means of image recognition.

FIGS. 7 and 8 each show photographic images as an example of a visual representation (46) of the spectacle frame image data set collected for a selected spectacle frame (32). In addition to a tape measure as a scale (36), FIG. 8 also shows two openings (38) for fixing the spectacle frame. In addition, the picture of FIG. 8 illustrates lines that serve to determine the face form angle (44).

FIG. 9 shows a photographic image as an example of the visual representation (48) of a user image data set, where in particular the user (50) can be seen with the worn, selected spectacle frame (32).

LIST OF REFERENCE NUMERALS

12 providing a spectacle frame image data set
14 collecting user image data, searching the pupils of the user in the user image data, and determining a pupil data set
16 determining contour points
18 determining the individual wearing position
20 optimizing the spectacle lens to be produced 22 manufacturing the optimized spectacle lens
24 providing a tracer data set
26 edging the manufactured spectacle lens
31 ear piece
32 spectacle frame/spectacles
33 bridge of the spectacle frame
34 background plate (image background surface)
36 scale (tape measure, marks of a certain size, known pattern)
38 fastener/bracket
40 camera (digital camera, camera in tablet, webcam, mobile phone camera)
42 click positions in the image
44 face form angle
46 visual representation of a spectacle frame image data set
48 visual representation of a user image data set
50 user

The invention claimed is:

1. A method of determining user data for the production of an individual spectacle lens for a selected spectacle frame for a user, comprising:
collecting user image data of at least a portion of the user's head together with at least part of the selected spectacle frame worn by the user;
providing a spectacle frame image data set of the selected spectacle frame, which spectacle frame image data set being created independent of the user image data;
finding the pupils of the user in the user image data and determining a pupil data set, said pupil data set comprising the size and/or the shape and/or the relative distance of the pupils of the user; and
determining contour points of the rim of the spectacle lens to be produced in the user image data based on the spectacle frame image data set and the pupil data set.

2. The method according to claim 1, wherein determining the contour points of the rim of the spectacle lens to be produced comprises finding the bridge of the spectacle frame in the user image data based on the spectacle frame image data set.

3. The method according to claim 1, wherein determining the pupil data set comprises detecting the pupillary distance, and wherein determining the contour points of the rim of the spectacle lens to be produced is performed using a scaling factor, which is estimated on the basis of a comparison of the detected pupillary distance with a standard specification for the pupillary distance.

4. The method according to claim 1, which further comprises:
determining at least one distinguished point of a user's eye from the user image data; and
determining individual parameters of the wearing position from the location of the determined contour points of the rim of the spectacle lens to be produced relative to the at least one distinguished point.

5. The method according to claim 1, wherein providing a spectacle frame image data set of the selected spectacle frame comprises collecting image data of the selected spectacle frame in front of a predetermined image background surface.

6. The method according to claim 5, wherein providing a spectacle frame image data set of the selected spectacle frame comprises determining the dimension of at least parts of the spectacle frame on the basis of a scale.

7. The method according to claim 5, wherein the selected spectacle frame includes sample support glasses and/or sample lenses, and wherein for collecting the image data of the selected spectacle frame, the spectacle frame is illuminated with light that is noticeably absorbed by the sample support glasses and/or sample lenses of the spectacle frame.

8. The method according to claim 5, wherein collecting the image data of the selected spectacle frame is performed with the help of at least one camera from different angles.

9. The method according to claim 1, wherein collecting user image data comprises:
collecting a first user image data set, which represents at least a portion of the user's head together with at least part of the selected spectacle frame worn by the user in a first direction of acquisition; and
collecting a second user image data set, which represents at least a portion of the user's head together with at least part of the selected spectacle frame worn by the user in a second direction of acquisition.

10. The method according to claim 9, wherein determining individual parameters of the wearing position comprises:
determining a three-dimensional position of the at least one distinguished point of the eye on the basis of the first and second user image data sets; and
determining three-dimensional positions of the contour points of the rim of the spectacle lens to be produced on the basis of the first and second user image data sets.

11. The method according to claim 1, which further comprises displaying the user image data together with the determined contour points.

12. A computer program product, comprising computer-readable instructions, which, when loaded into a memory of a computer and executed by the computer, cause the computer to perform a method according to claim 1.

13. The method according to claim 1, wherein determining contour points of the rim of the spectacle lens in the user image data uses those pixels of the user image data that together describe a geometric shape, which by translation and/or rotation and/or scaling and/or projection results from the course of the rim of the spectacle lens that is recognizable in the spectacle frame image data set, and that in their entirety stand out in contrast and/or color from their surrounding.

14. An apparatus for determining user data for producing an individual spectacle lens for a selected spectacle frame for a user, comprising:
a user image acquisition apparatus for collecting user image data at least of a portion of the user's head together with the selected spectacle frame worn by the user; and
a data storage for storing a spectacle frame image data set, which spectacle frame image data set being created independent of the user image data;
an evaluation device for searching the pupils of the user, for determining a pupil data set, and for determining contour points of the rim of the spectacle lens to be produced in the user image data based on the spectacle frame image data set and the pupil data set, wherein the pupil data set comprises the size and/or the shape and/or the relative distance of the user's pupils.

15. The apparatus according to claim 14, further comprising a spectacle frame image acquisition device for collecting the spectacle frame image data set of the selected spectacle frame.

16. The apparatus according to claim 15, wherein
the spectacle frame image acquisition device includes an image background surface, in front of which the selected spectacle frame can be arranged, and fasteners for the selected spectacle frame, and/or wherein
the spectacle frame image acquisition device includes a scale, and/or wherein the spectacle frame image acquisition device comprises at least one camera and lighting means.

17. The apparatus according to claim 14, which further comprises an image display device for outputting the user image data together with the determined contour points to the user.

18. The apparatus according to claim 14, wherein the evaluation device for determining contour points of the rim of the spectacle lens in the user image data uses those pixels of the user image data that together describe a geometric shape, which by translation and/or rotation and/or scaling and/or projection results from the course of the rim of the spectacle lens that is recognizable in the spectacle frame image data set, and that in their entirety stand out in contrast and/or color from their surrounding.

* * * * *